Jan. 29, 1929.       1,700,714
J. OSTERTAG
METHOD FOR REMOVING EASILY SOLUBLE SALTS FROM BOILER FEED WATER
Filed July 7, 1922
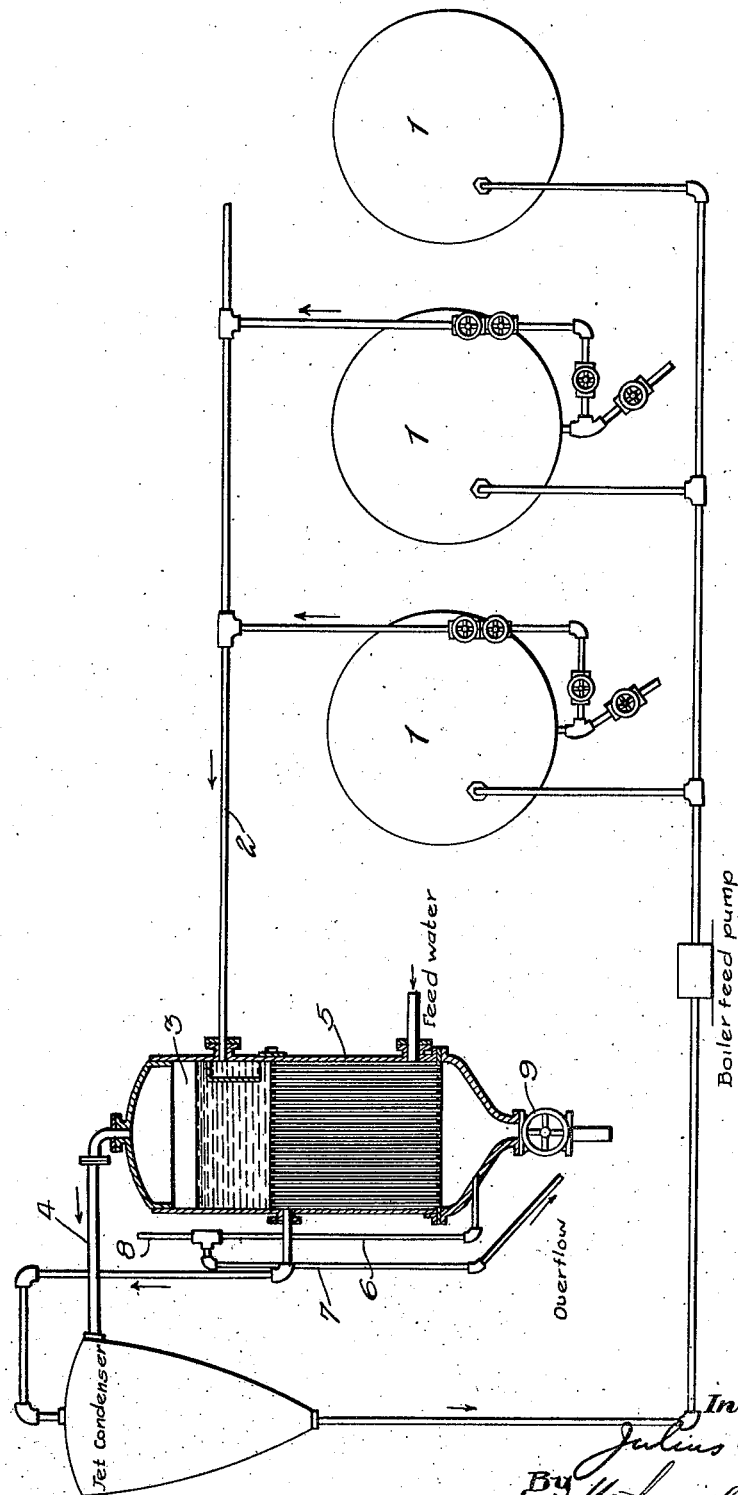

Patented Jan. 29, 1929.

1,700,714

UNITED STATES PATENT OFFICE.

JULIUS OSTERTAG, OF STUTTGART, GERMANY.

METHOD FOR REMOVING EASILY-SOLUBLE SALTS FROM BOILER FEED WATER.

Application filed July 7, 1922, Serial No. 573,414, and in Poland February 8, 1922.

This invention relates to a method for removing easily soluble salts from boiler feed-water, and includes reducing the pressure in boiler water, to thereby obtain condensate free from salts, and adding the condensate to a crude water which has extracted the remaining heat from the above treated boiler-water.

In many boiler installations feed water containing large quantities of salts must be used. Such water is very unsuitable for feeding steam boilers, because the easily soluble salts which are continuously introduced into the boiler by the water, concentrate in the boiler and cause all kinds of disturbances. The salts settle for example in the engines and apparatus and there cause a speedy wearing away through incrustation.

For the purpose of avoiding disturbances, it has generally been the practice hitherto to empty the steam boilers at short intervals and to fill them with fresh water or to convey a portion of the boiler water containing the concentrated salts into the open air and to supplement the same with fresh water. All these measures caused as a result the loss of a large quantity of highly heated water. As frequently also the chemicals required for softening the water were in excess in the boiler-water, there was a loss of such chemicals when a boiler was blown off. By means of the arrangement according to the present invention these disadvantages are completely avoided.

An arrangement of this kind is fully illustrated in the accompanying drawing wherein, The figure is an elevation, partly in section, of one type of installation.

In the case of the arrangement according to the figure a definite quantity of boiler-water is conveyed continuously from a steam-boiler 1 to an evaporator 3 by means of a boiler-water pipe 2. The quantity of the boiler-water carried off from the boiler is dependent on the quantity of salt contained in the boiler-water. Normally so much boiler-water is carried off that the concentration of the easily soluble salts in the boiler water still amounts to 2° Bé. The boiler-water entering the low pressure evaporator 3 is reduced in pressure when it enters, in consequence of which heat of the liquid corresponding to the change in pressure is set free. Normally the pressure in the evaporator will amount to 0.1-0.2 atmospheres.

The boiler-water blow off will thus cool down to about 100° C. Thereby according to the original temperature of the boiler-water, a fifth of the blow off water under ordinary working conditions will be set free in the form of steam and escape through a pipe 4 to a feed-water reservoir such as a jet condenser or the like, where it is condensed. In this way a large portion of the heat contained in the boiler-water is recovered, and also approximately a fifth of the waste water containing salts is obtained as water of condensation. The feed-water is thereby heated and the hardness of the same diluted according to the amount of condensate added. The boiler-water containing salts and cooled down to 100° C. in the evaporator 3 thereby becomes more powerfully concentrated with salts by this procedure. The boiler water next flows out of the evaporator 3 through a preliminary heater 5 that is in connection therewith. This may be preferably built together with the evaporator 3. Through the preliminary heater 5 the feed-water that has not been preliminarily heated flows in counter-current and completely extracts the remaining heat from the boiler waste water. In connection herewith the boiler waste water containing salts cools down approximately to the temperature of crude water. By means of this arrangement not only all of the heat contained in the boiler water is thus recovered but there is provided a certain percentage of the water in the form of water of condensation. By way of summary it may be said that if the losses arising through cooling down etc., are left out of consideration, the removal from the boiler 1 of the boiler-water containing salts is not attended with loss of any kind.

Moreover the dangerous direct drawing off from the boiler 1 is obviated. The arrangement works perfectly automatically and requires no watching. An important feature of the method is that the level of the water in the evaporator 3 is regulated quite automatically without any movable parts by means of the overflow and safety pipe 6. This latter is connected to the lower part of the preliminary heater 5 and is carried high up on the apparatus. From the place where the highest water level is situated, a branch pipe 7 is arranged to extend downwards, and an extension 8 to extend upwards. The upward extension is for enabling the overflow pipe to be vented while the branch-pipe 7 affords an overflow for water to flow down and away. In order to protect the overflow and safety pipe 6 from being choked-up with sludge, it is connected to and slightly above the lower end of the cylindrical part of the preliminary heater 5. The sludge coming with the boiler-water into the evaporator 3 and preliminary heater 5 is in this way deposited in the lower part of the preliminary heater 5 and can be drawn off from time to time into a sludge passage through a cock 9.

I claim—

1. In a method for continuous purification of boiler water during normal operation of a boiler, the steps comprising continuously blowing off sludge-containing water, conducting the blow-off water to a region of lower pressure while maintaining its heat content to generate steam, condensing the generated steam, passing make-up water and the remaining blow-off water in separate streams in heat exchanging relation to each other, adding the condensate to the heated make-up water to form feed water, and supplying the feed water to the boiler.

2. In a method for continuous purification of boiler water during normal operation of a boiler, the steps comprising continuously blowing off sludge-containing water, conducting the blow-off water to a region of lower pressure while maintaining its heat content to generate steam, condensing the generated steam, passing make-up water and the remaining blow-off water in separate streams in heat exchanging relation to each other, passing the cooled blow-off water to waste, adding the condensate to the heated make-up water to form feed water, and supplying the feed water to the boiler.

In testimony whereof I affix my signature.

JULIUS OSTERTAG. [L. S.]